(12) United States Patent
Kumano

(10) Patent No.: US 10,087,908 B2
(45) Date of Patent: Oct. 2, 2018

(54) UNDERWATER INSTALLATION-TYPE WATER-FLOW POWER GENERATION SYSTEM

(71) Applicant: JAPAN SYSTEM PLANNING CO., LTD., Tokyo (JP)

(72) Inventor: Katsuyuki Kumano, Tokyo (JP)

(73) Assignee: JAPAN SYSTEM PLANNING CO., LTD., Tokyo (JP)

( * ) Notice: Subject to any disclaimer, the term of this patent is extended or adjusted under 35 U.S.C. 154(b) by 0 days.

(21) Appl. No.: 15/219,123

(22) Filed: Jul. 25, 2016

(65) Prior Publication Data
US 2017/0030325 A1    Feb. 2, 2017

(30) Foreign Application Priority Data

Jul. 30, 2015  (JP) .................................. 5905984

(51) Int. Cl.
F03B 13/00    (2006.01)
F03B 13/10    (2006.01)
F03B 17/06    (2006.01)

(52) U.S. Cl.
CPC ............ F03B 13/10 (2013.01); F03B 17/063 (2013.01); F05B 2240/12 (2013.01);
(Continued)

(58) Field of Classification Search
CPC ............................. F03B 13/10; F03B 17/063
(Continued)

(56) References Cited

U.S. PATENT DOCUMENTS

| 2,501,696 A | * | 3/1950 | Souczek | F03B 17/061 |
|---|---|---|---|---|
| | | | | 290/43 |
| 4,335,319 A | * | 6/1982 | Mettersheimer, Jr. | ...................... |
| | | | | F03B 17/063 |
| | | | | 290/54 |

(Continued)

FOREIGN PATENT DOCUMENTS

| JP | 07-259064 A | 10/1995 |
|---|---|---|
| JP | 2011-32940 A | 2/2011 |

(Continued)

OTHER PUBLICATIONS

International Search Report for WO 03056169 dated May 6, 2002, 6 pages.

*Primary Examiner* — Julio C. Gonzalez
(74) *Attorney, Agent, or Firm* — Lynette Wylie; Apex Juris, PLLC.

(57) ABSTRACT

An underwater installation-type water-flow power generation system including a weight body fixedly installed on a bottom of a sea area with an ocean current, a power generating device including a diagonal plate frontage portion moored by the weight body through a mooring fixture and provided on a front part of a power generating device body, a variable blade type rotary impeller, and a power generator for obtaining a power generation output by using a rotary force of the variable blade type rotary impeller; and a buoyancy body floating in the ocean current area above the power generating device body and applying a tension to the power generating device body through a pulling tool so that the diagonal plate frontage portion of the power generating device body is facing the ocean current at all times.

7 Claims, 6 Drawing Sheets

(52) U.S. Cl.
CPC ........... *F05B 2240/13* (2013.01); *Y02E 10/22* (2013.01); *Y02E 10/28* (2013.01)

(58) Field of Classification Search
USPC .................................................... 290/43, 54
See application file for complete search history.

(56) References Cited

U.S. PATENT DOCUMENTS

| | | | | |
|---|---|---|---|---|
| 4,850,190 A * | 7/1989 | Pitts | ........................ | F03B 13/10 290/53 |
| 6,531,788 B2 * | 3/2003 | Robson | ................. | F03B 17/061 290/42 |
| 7,541,688 B2 * | 6/2009 | Mackie | ................... | F03B 13/26 290/54 |
| 7,682,126 B2 * | 3/2010 | Parker | .................. | F03B 17/061 415/3.1 |
| 7,737,570 B2 * | 6/2010 | Costin | ................... | F03B 17/061 290/43 |
| 7,851,936 B2 * | 12/2010 | Bolin | ...................... | F03B 13/10 290/43 |
| 8,956,103 B2 * | 2/2015 | Gehring | ................. | F03B 13/10 415/7 |
| 2008/0088135 A1 * | 4/2008 | Novo Vidal | .......... | F03B 13/083 290/54 |
| 2010/0181774 A1 * | 7/2010 | Dehlsen | .................. | B63B 21/50 290/54 |
| 2010/0327583 A1 * | 12/2010 | Hunt | ....................... | B63B 21/50 290/43 |
| 2011/0025069 A1 * | 2/2011 | Kumano | ............... | F03B 17/061 290/54 |

FOREIGN PATENT DOCUMENTS

| | | |
|---|---|---|
| JP | 5389082 B2 | 1/2014 |
| JP | 5905984 | 4/2016 |
| WO | WO03/056169 A1 | 7/2003 |

\* cited by examiner

UNDERWATER INSTALLATION-TYPE WATER-FLOW POWER GENERATION SYSTEM

BACKGROUND OF THE INVENTION

Field of the Invention

The present invention relates to an underwater installation-type water-flow power generation system and particularly to an underwater installation-type water-flow power generation system constituted so that a power generation output can be obtained efficiently by using an ocean current or a water flow which is natural energy on the basis of simple and inexpensive installation.

Description of the Related Art

Recently, power generation systems using natural energy with solar energy as an energy source are in demand.

Among them, solar light using solar energy projected to land occupying 30% of the solar energy projected onto the earth, wind power, biomass, water power generation and the like have progressed, and the solar energy of 70% projected to the sea is converted mainly to ocean current energy or the like but most of it is not used.

As a result, development of a power generating device using a water flow (ocean current, tidal current) which has begun to attract attention lately mostly utilizes wind power generating device of a type of rotating a propeller similarly to the wind power.

However, with this method, since a rotary motion is made by changing an energy direction by 90 degrees, it has a demerit that energy loss is large.

A power generation method using a water flow is roughly divided into two systems, that is, (1) a power generation system by installing a wind-mill like propeller machine on a sea bottom (or under the sea) and (2) a power generation system by an ocean current by floating a power generating device moored by an anchor installed on a sea bottom (or under the sea) in the sea.

The most important thing in considering these power generation systems using the water flow (ocean current) is the following formula based on fluid dynamics:

Power generation amount=½×(seawater specific gravity)×(flow velocity)³×(area of blade)× (power generation efficiency)

An important point in this formula is that the power generation amount is in proportion to the cube of the flow velocity.

On the basis of this power generation formula, it is difficult to obtain a sufficient flow velocity in the case of the method of installing a propeller machine on the sea bottom, and the power generation amount is drastically reduced.

In order to solve this problem, such a method can be suggested that a power generating device including a propeller machine is floated and arranged at a spot away from the sea bottom where the flow velocity is high as much as possible for power generation, but in this method, it is difficult to stabilize the power generating device including the floating propeller machine, and it is not easy, either, to increase arrangement density of the power generating device, which is a problem.

From the aforementioned reasons, the prior-art ocean-current power generating device such as the following Patent Literature 1 has not been realized at present.

Patent Literature 1 proposes an ocean-current power generating submersible ship in which a floating body having a conduit faced with the flow is moored from bow in a sea area with an ocean current, the conduit has a water inlet on a whole surface of the bow, a water outlet is provided at a stern, a center of the conduit has a circular shape having the sectional area of one several tenths of a sectional area perpendicular to the ocean current of a water inlet, and constituted to operate a power generator by attaching a water mill, a depth of the center of a rotating shaft of the water mill of the floating body is submerged to a depth equal to a height of velocity head of the flow velocity of the ocean current at the position of the water mill, and 100% of the ocean current coming to the water inlet is taken in.

In the case of the ocean-current power generating submersible ship of Patent Literature 1, in order to maintain a floating attitude horizontal, water poured amounts of a plurality of air tanks are adjusted, and a rudder is provided.

However, in the case of this ocean-current power generating submersible ship of Patent Literature 1, if the floating body is small, the floating body can easily rotate and move up/down and right/left by a water flow, and it is difficult to maintain the attitude horizontal and thus, the floating body needs to be large-sized and since the power generator is integrated with the floating body, an extremely long tunnel-shaped conduit with respect to the water flow direction is needed, and problems that the ocean-current power generating submersible ship becomes large-sized, a manufacturing cost is raised and the like are contained.

[Patent Literature 1] Japanese Patent Laid-Open No. 7-259064

SUMMARY OF THE INVENTION

A problem to be solved by the present invention is that there has not been such an underwater installation-type water-flow power generation system in which a power generation output can be obtained efficiently by using an ocean current or a water flow which is natural energy and also provide a stable supply of low-price generation power generation can be realized on the basis of based on a simple and inexpensive installation constitution.

In one example embodiment, the inventive subject matter is directed to an underwater installation-type water-flow power generation system including having a weight body fixed/installed on a water bottom of a water area with a water flow of the sea or river, a power generating device including a power generating device body arranged in a water flow area above the weight body in the water area and moored by the weight body through a mooring fixture, a diagonal plate frontage portion for water-flow inflow provided on a front part of this power generating device body, a variable blade type rotary impeller provided on a rear part of the power generating device body, and a power generator for obtaining a power generation output by using a rotary force of the variable blade type rotary impeller. A hollow tank is incorporated in the variable blade type rotary impeller and generates buoyancy equal to a weight of the rear part of the power generating device body. A buoyancy body floats or is arranged in the water-flow area above the power generating device body and applies a tension to the power generating device body through a pulling tool so that the diagonal plate frontage portion of the power generating device body is facing a direction of the water flow at all times so that a force of buoyancy is applied only to a range from a front end portion of the diagonal plate frontage portion of the power generating device body to an intermediate part of the power generating device body. By a combined action of the buoyancy balance on the rear part of the power generating device body by the hollow tank and the application of tension to the front part of the power generating device body by the buoyancy body through the pulling tool, position control is executed so that the diagonal plate frontage portion is facing with the direction of the water flow at all times.

According to another example embodiment, the underwater installation-type water-flow power generation system has the weight body fixedly installed on a bottom of the water area with the water flow of the sea or river, the power generating device including the power generating device body arranged in the water flow area above the weight body in the water area and moored by the weight body through the mooring fixture, a diagonal plate frontage portion for water-flow inflow provided on a front part of the power generating device body, the rotary-drum type variable blade type rotary impeller rotated by the water flow and provided on a rear flow side of this diagonal plate frontage portion, and the power generator mounted on the rear part side of the power generating device body and obtaining a power generation output by using a rotary force of the variable blade type rotary impeller, and a buoyancy body floating in the water-flow area above the power generating device body and applying a tension to the power generating device body through the pulling tool connected to the power generating device body, wherein a hollow tank generating a buoyancy equal to a weight of a rear part of the entire power generating device in the water is incorporated in the variable blade type rotary impeller. The buoyancy body and the power generating device body are connected by the pulling tool so that an action of the tension by the buoyancy body is applied only to a range from a front end portion of the diagonal plate frontage portion forming the front part of the power generating device body to an intermediate part of the power generating device body. By a combined action of the buoyancy balance on the rear part of the power generating device body by the hollow tank and the application of the tension to the front part of the power generating device body by the buoyancy body through the pulling tool, position control is executed so that the diagonal plate frontage portion is facing the direction of the water flow at all times. Such an underwater installation-type water-flow power generation system can generate efficiently by using the ocean current or the water and can supply a power based on simple and inexpensive installation.

In any of the foregoing example embodiments, the power generating devices can be arranged in series in a direction orthogonal to a water flow direction, such that a power generating device with a small occupying space can be realized and provided.

According to yet another example embodiment, the underwater installation-type water-flow power generation systems, each constituted by the weight body, the power generating device, the buoyancy body, the mooring fixture, and the pulling tool, can be arranged at plural sites in the water area with the water flow.

DETAILED DESCRIPTION OF THE PREFERRED EMBODIMENTS

The inventive subject matter provides an underwater installation-type water-flow power generation system which can obtain power generation output efficiently by using the ocean current or the water flow which is natural energy and provide a stable supply of low-price power generation based on the simple and inexpensive installation of an underwater installation-type water-flow power generation system having a power generating device including a weight body fixed/installed on a water bottom of a water area with a water flow of the sea or river, a power generating device body arranged in a water flow area above the weight body in the water area and moored by the weight body through a mooring fixture, a diagonal plate frontage portion for water-flow inflow provided on a front part of the power generating device body, a rotary-drum type variable blade type rotary impeller rotated by the water flow and provided on a rear flow side of this diagonal plate frontage portion, and a power generator mounted on a rear part side of the power generating device body and obtaining a power generation output by using a rotary force of the variable blade type rotary impeller and a buoyancy body floated/arranged in the upper water-flow area of the power generating device body and applying a tension to the power generating device body through a pulling tool connected to this power generating device body, constituted such that a hollow tank generating a buoyancy equal to a weight of a rear part of the entire power generating device in the water is incorporated in the variable blade type rotary impeller, the buoyancy body and the power generating device body are connected by the pulling tool so that an action of the tension by the buoyancy body is applied only to a range from a front end portion of the diagonal plate frontage portion forming the front part of the power generating device body to an intermediate part of the power generating device body, and by a combined action of the buoyancy balance on the rear part side from the intermediate part by the hollow tank and the application of the tension to the front part of the power generating device body by the buoyancy body through the pulling tool, position control is executed so that the diagonal plate frontage portion is facing the direction of the water flow at all times.

EXAMPLE EMBODIMENT

An underwater installation-type water-flow power generation system according to an embodiment of the present invention will be described below in detail by referring to the attached drawings.

Figure 1:
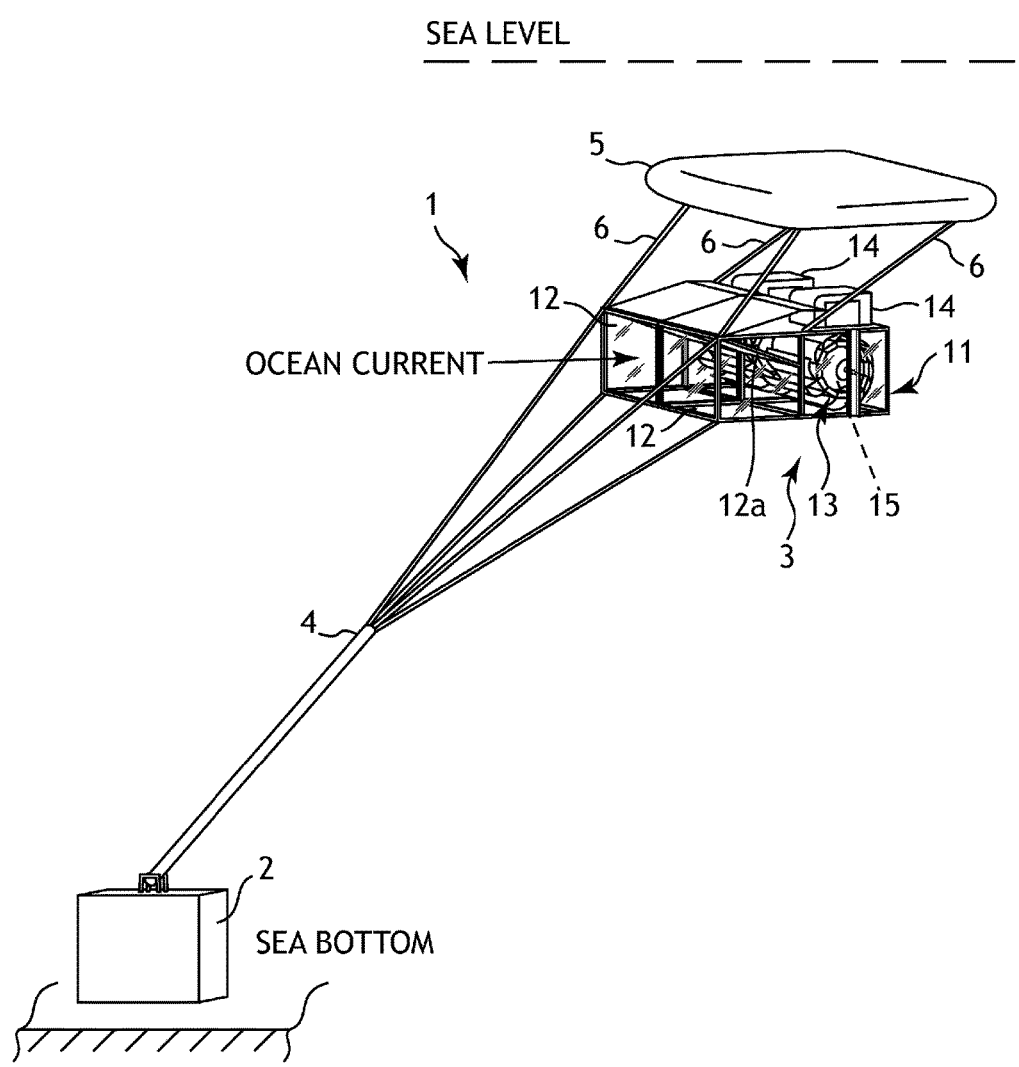
FIG. 1 is a schematic perspective view illustrating an entire constitution of an underwater installation-type water-flow power generation system according to an embodiment of the present invention.
Figure 2:
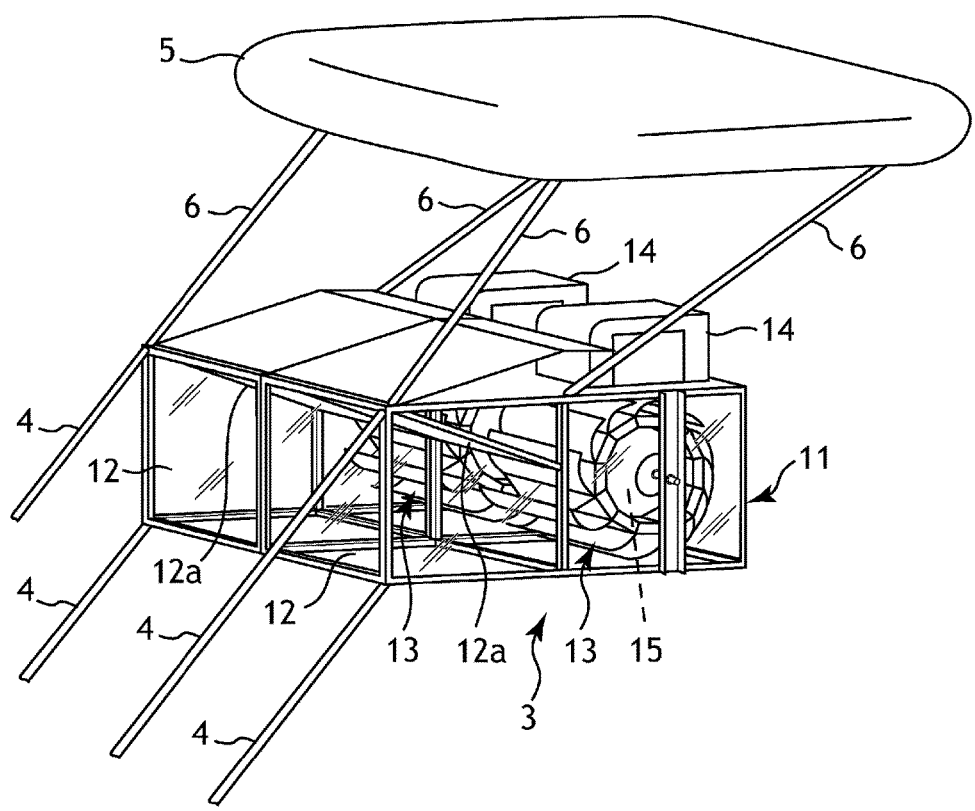
FIG. 2 is an enlarged perspective view of a power generating device in the underwater installation-type water-flow power generation system according to the embodiment shown in FIG. 1.

The underwater installation-type water-flow power generation system 1 according to this embodiment has, as illustrated in FIGS. 1 and 2, a weight body 2 having a weight of 5 t, for example, fixed/installed on a sea bottom of a sea area with an ocean current with a flow velocity of 1 to 3 m/s, for example, a power generating device 3 presenting a substantially cuboid shape having a weight of 5 t, for example, arranged in an ocean current area above the weight body 2 in the sea area and connected to the weight body 2 by a mooring fixture 4 such as a wire, a rope or the like and moored, and a buoyancy body 5 floating under the sea floated/arranged in the upper ocean current area of this power generating device 3 and connected to the power generating device 3 by a pulling tool 6 such as a wire, a rope or the like.

For each of the mooring fixture 4 and the pulling tool 6, those which can endure tensile strength of approximately 100 t, for example, are used.

The power generating device 3 includes, as illustrated in FIGS. 1 and 2, a power generating device body 11 having a cuboid cylindrical shape.

With respect to this power generating device body 11, a diagonal plate opening portion 12 for ocean current inflow provided on a front part (side facing the ocean current), a rotary-drum type variable blade type rotary impeller 13 rotated by the ocean current and provided on a rear flow side of this diagonal plate frontage portion 12, and a power generator 14 mounted on a rear part side of the power generating device body 11 and obtaining a power generation output by using a rotary force of the variable blade rotary impeller 13 are arranged in a parallel structure in two rows in a direction orthogonal to an inflow direction of the ocean current so as to discharge the ocean current rearward from the rear part side of the variable blade type rotary impeller 13.

The diagonal plate frontage portion 12 is formed by a housing portion of the power generating device body 11 and a diagonal plate 12a arranged with downward inclination as it goes from the front part of the power generating device body 11 toward the variable blade type rotary impeller 13 side.

Moreover, in the variable blade type rotary impeller 13, a hollow tank 15, which creates buoyancy equal to the weight of the rear part of the power generating device, is incorporated.

That is, the power generating device 3 in the underwater installation-type water-flow power generation system 1 according to this embodiment has a double structure including two units of the diagonal plate opening portions 12, two units of the variable blade type rotary impellers 13 including the hollow tank 15, and two units of the power generators 14, for example.

A connection structure between the weight body 2 and the power generating device body 11 by the mooring fixture 4 is such that one end of the mooring fixture 4 is divided into four pieces and is connected at four corners at both right and left sides of the diagonal plate opening portion 12 of the power generating device body 11. The four pieces of the connection structure are gathered and integrated at middle positions of the mooring fixture, and the other end portion of the mooring fixture 4 is connected to the weight body 2 fixed/installed on the sea bottom, whereby the power generating device body 11 is moored by the weight body 2 through the mooring fixture 4 so as not to be washed away.

Subsequently, a connection structure between the power generating device body 11 and the buoyancy body 5 by the pulling tool 6 will be described.

In this embodiment, the buoyancy body 5 and the power generating device body 11 are connected by the pulling tool 6 so that an action of a tension by the buoyancy body 5 is applied only to a range from a front end portion of the diagonal plate frontage portion 12 forming the front part of the power generating device body 11 to an intermediate part of the power generating device body 11 (a substantially intermediate position of the flow direction of the ocean current).

Specifically, lower both corner portions of the front part (side facing the ocean current) of the buoyancy body 5 and the upper both corner portions of the diagonal plate frontage portion 12 of the power generating device body 11 are connected by the two pulling tools 6, and the lower both corner portions of the rear part of the buoyancy body 5 and the rear part side both side portions of the power generating device body 11 are connected by the two pulling tools 6.

That is, in detail, the buoyancy body 5 and the power generating device body 11 have a structure in which the lower both corner portions of the front part (side facing the ocean current) of the buoyancy body 5 and the upper both corner portions of the diagonal plate opening portion 12 of the power generating device body 11 are connected by the two pulling tools 6, and the lower both corner portions of the rear part of the buoyancy body 5 and the both side portions at a range position of a substantially center part or the front part (side facing the ocean current) from the center part of the power generating device body 11 are connected by the other two pulling tools 6.

As a result, by a combined action of buoyancy balance on the rear part side from the intermediate part of the power generating device 3 by the hollow tank 15 and the application of the tension to the front part of the power generating device body 11 by the buoyancy body 5 through the pulling tool 6, position control is executed so that the diagonal plate opening portion 12 of the power generating device body 11 is directed to the certain direction faced with the direction of the ocean current at all times.

Specific constitution of the variable blade type rotary impeller 13 is omitted, but as its basic constitution, constitution of a variable blade type rotary impeller in a water-wheel impeller type power generating device disclosed in Japanese Patent No. 5389082 held by the applicant of the present application is employed.

According to the underwater installation-type water-flow power generation system 1 according to this embodiment described above, the following actions and effects are exerted.

According to the underwater installation-type water-flow power generation system 1, since the position control is executed so that the diagonal plate frontage portion 12 of the power generating device body 11 is facing the direction of the ocean current at all times, by efficiently rotating the variable blade type rotary impeller 13 in the same direction as the flow of the sea water flowing in from this diagonal plate opening portion 12, energy loss can be reduced.

Moreover, in the variable blade type rotary impeller 13, due to a variable blade structure in which the impeller is folded other than counterflow against the ocean current, a rotation loss of the variable blade type rotary impeller 13 is minimized.

As a result, power generation efficiency is increased in the power generating device 3 as a whole, and a large power generation output can be obtained from the two units of the power generators 14.

In addition to the aforementioned case, it may also be so constituted that a multi-link structure in which two, three, four or more plural units of the power generating devices 3 are further continuously provided in a direction orthogonal to the water-flow direction is realized so as to obtain a much larger power generation output from all of them, though not illustrated.

By combining the weight body 2 and the buoyancy body 5, the power generating device 3 does not swing in the water but can be installed extremely simply and inexpensively since a complicated installing work is not required, and moreover, it can be stably installed in the sea water and can be installed in a sea area with an ocean current with a fast flow velocity such as the Black Current.

Moreover, an underwater installation-type water-flow power generation system including a combination of single structural bodies has the advantage that risk of failures is low and that maintenance and control are easy.

Figure 3:
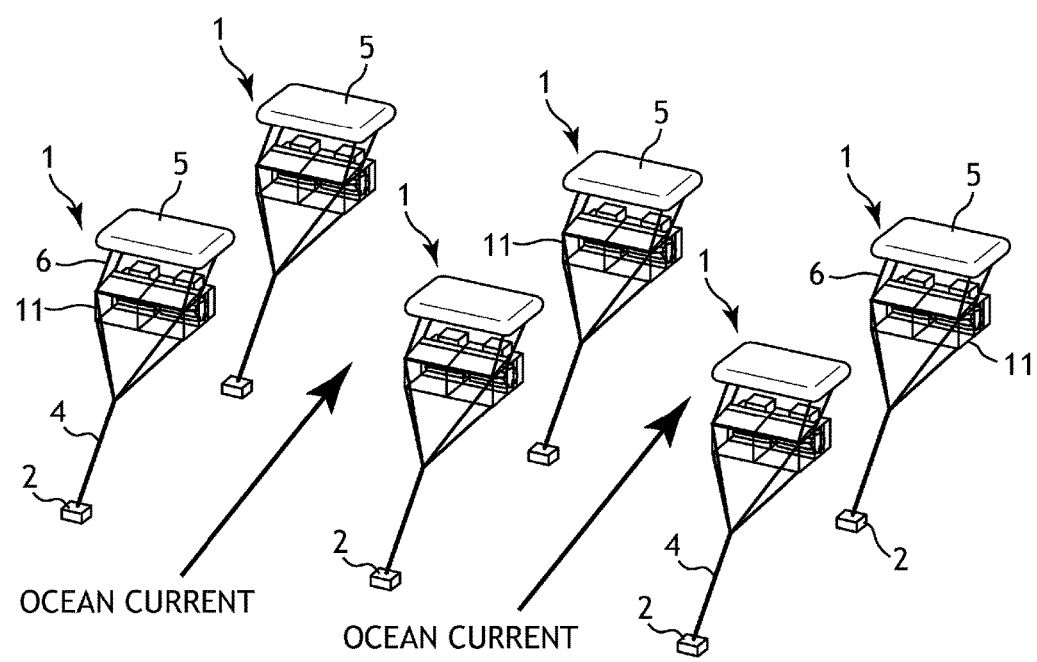
FIG. 3 is a schematic perspective view illustrating a case of system constitution in which 6 units of the underwater installation-type water-flow power generation system according to this embodiment are distributed/arranged in a sea area with an ocean current.

FIG. 3 is multi-system constitution in which six units of the underwater installation-type water-flow power generation systems 1 are installed in a distributed arrangement state in the sea area with the ocean current.

In this case, an occupied area per single system is small and installation in high density is possible and thus, efficiency of a transmission system relating to the power generation output by the 12 units of the power generators in total can be improved.

The embodiment illustrated in FIG. 3 is only an example, and the number of installations of the multi-system constitution is not particularly limited but can be a larger multi-system constitution of 20 units, 50 units or the like as necessary so as to obtain large electricity.

Figure 4:
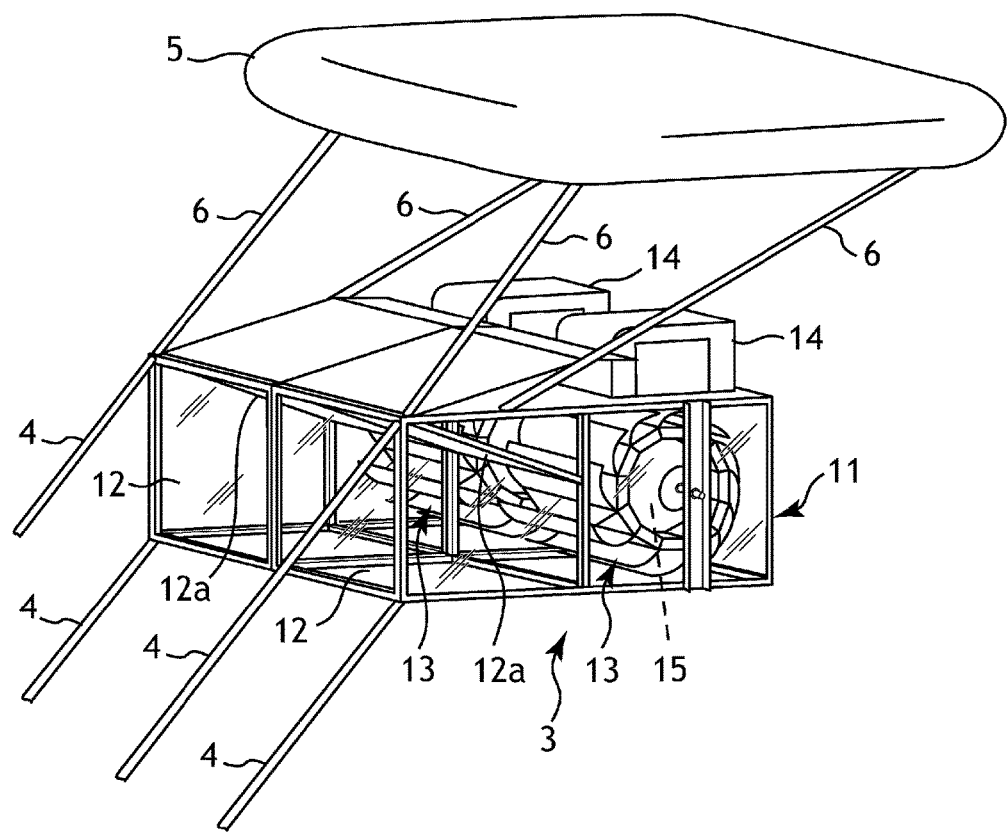
FIG. 4 is a schematic perspective view illustrating another connection mode of a pulling tool for applying a tension to a power generating device form a buoyancy body in the underwater installation-type water-flow power generation system according to this embodiment.

FIG. 4 illustrates another example when the buoyancy body 5 and the power generating device body 11 are connected by the pulling tool 6, and in this case, such a structure is provided that the lower both corner portions of the front part (side facing the ocean current) of the buoyancy body 5 and the upper both corner portions of the diagonal plate opening portion 12 of the power generating device body 11 are connected by the two pulling tools 6, and the lower both corner portions on the rear part of the buoyancy body 5 and the both side portions on the side facing with the ocean current more than the case in FIGS. 1 and 2 of the power generating device body 11 are connected by the two pulling tools 6.

The connection structure illustrated in FIG. 4 also allows for the actions and effects similar to the embodiment described above.

Figure 5:
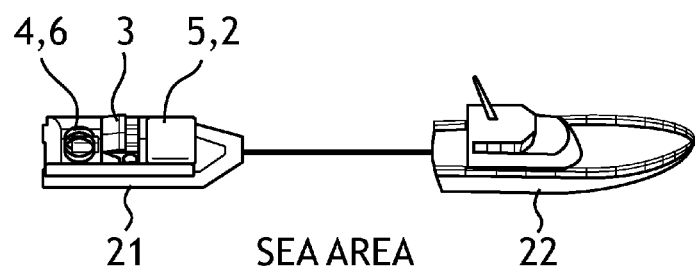
FIG. 5 is a schematic perspective view illustrating a state in which the power generating device, the buoyancy body and the like are placed on a ship for transportation towed by a tug boat and transported to an installation water area when the underwater installation-type water-flow power generation system according to this embodiment is to be constructed.

Subsequently, by referring to each of the figures including FIG. 5, one example of a construction method of the underground installation-type water-flow power generation system 1 will be outlined.

This construction method is such that the weight body 2, the power generating device 3, the buoyancy body 5, the mooring fixture 4, and the pulling tool 6 are placed on a ship 21 for transportation towed by a tug boat 22 and transported to an installation water area, the weight body 2, the power generating device 3, and the buoyancy body 5 are thrown into the sea of the installation water area, the weight body 2 is sunk to the sea bottom and fixed/installed, the power generating device 3 arranged in an ocean current area above the weight body 2 in the water area is moored by the weight body 2 through the mooring fixture 4, the buoyancy body 5 floated/arranged in the upper ocean current area of the power generating device 3 and the power generating device 3 are connected by the pulling tool 6 as described above, and a tension is applied to the power generating device 3 by the buoyancy body 5 through the pulling tool 6 so that the diagonal plate frontage portion 12 is facing the direction of the ocean current at all times.

According to such construction method, since a large-sized heavy machine does not have to be used as a method for throwing the weight body 2, the power generating device 3, the buoyancy body 5 and the like into the sea, the underwater installation-type water-flow power generation system 1 can be constructed with an extremely low cost, and moreover, it can be installed extremely simply and inexpensively since a complicated installing work is not required and can be stably installed under the sea, and the underwater installation-type water-flow power generation system 1 with a low power generation cost can be constructed.

As described above, when power generation is performed by using the ocean current, according to this embodiment, a novel and inexpensive construction method of a novel ocean current power generation system of a type submerged under the sea in which no influence is given by bad weather, strength of a structure does not have to be too strong, an installation work cost can be low, and a power generation output can be obtained continuously for 24 hours, that is, an ideal ocean current power generation system under the sea can be realized.

Figure 6:
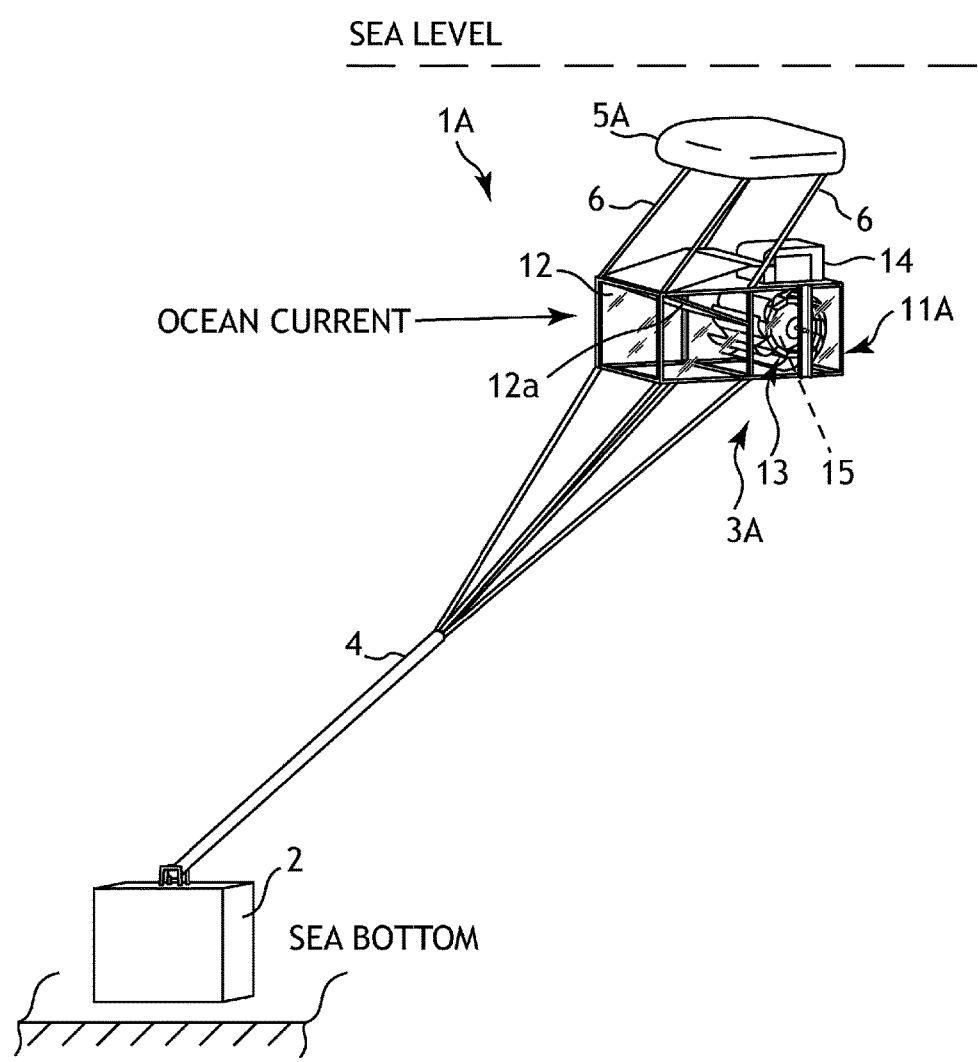
FIG. 6 is a schematic perspective view illustrating another constitution example of the underwater installation-type water-flow power generation system according to the inventive subject matter.

FIG. 6 illustrates an underwater installation-type water-flow power generation system 1A which is a variation of the underwater installation-type water-flow power generation system 1, and the same elements as those in the underwater installation-type water-flow power generation system 1 are illustrated with the same reference numerals.

The underwater installation-type water-flow power generation system 1A has a basic structure similar to that of the aforementioned underwater installation-type water-flow power generation system 1 but is characterized in that a power generating device 3A having a single-row structure is employed instead of the power generating device 3 and a single-layer small-sized buoyancy body 5A is employed instead of the buoyancy body 5.

The power generating device 3A includes, unlike the power generating device 3, the diagonal plate frontage portion 12, the variable blade type rotary impeller 13, and the power generator 14 one each in a power generating device body 11A.

Constitution of the remaining weight body 2, the mooring fixture 4, and the pulling tool 6 is substantially similar to that of the underwater installation-type water-flow power generation system 1 according to the aforementioned embodiment.

According to the variation illustrated in FIG. 6, the system includes the diagonal plate frontage portion 12, the variable blade type rotary impeller 13, and the power generator 14 one each in a power generating device body 11A as the power generating device 3A, of which the effects are substantially similar to those of the underground installation-type water-flow power generation system 1 described above. The underground installation-type water-flow power generation system 1A is relatively small-scale and inexpensive and has a small power generation output.

It is possible to install a multi-system embodiment in which the underground installation-type water-flow power generation system 1A of the variation illustrated in FIG. 6 is installed in plural units in the sea area with the ocean current similarly to the case illustrated in FIG. 3.

In addition, the following points can be cited on the underground installation-type water-flow power generation system 1 of this embodiment.

When the underground installation-type water-flow power generation system 1 of this embodiment is compared with other methods using natural energy, since the sea water has a mass of approximately 1000 times of that of air, it has a larger power generation amount as compared with wind power generation method with the same installation area and moreover, has a benefit of much larger installable place as compared with the wind power generation method.

Moreover, as compared with the solar power generation method, the wind power generation method and the like, since the ocean current energy is obtained at all times, a power generation system which can obtain stable power generation outputs at all times can be realized in a point that power generation is possible for 24 hours in 365 days without a rest.

Subsequently, considering contribution to economic regeneration of our country, though the power consumption amount of Japan is the third rank in the world at present, energy self-sufficiency rate excluding nuclear power is 4.4% (2010) which is the lowest level in advanced countries.

In such circumstances, the East Japan Great Earthquake which occurred in March of 2011 not only had seriousness of its damage but also made clear the problem of energy supply in our country.

Particularly after all the nuclear power plants were stopped in 2013, a ratio of thermal power generation has risen to approximately 90% and dependency on fossil fuels has rapidly risen.

With the recent emergence of shale gas in the States, the price of the fossil fuels has a falling tendency but most of the countries form which the fossil fuels are imported are in the Middle East region with frequent political/ethnic disputes, and stable supply is expected to become difficult in the future.

Therefore, an increase of the ratio of regenerable energy including the ocean current power generation and introduction of self-supporting energy are imminent problems.

Our country is generally recognized as an energy importing country with scare resources but is also the world's sixth country with exclusive economic zone and a country with potentially large marine-energy resources.

Among others, the Black Current flowing along the Pacific coast is one of the world's two major ocean currents as well as the Mexican Gulf Stream, and this energy is at the maximum level as potential of the regenerable energy of our country.

From these viewpoints, contribution to economic regeneration of the underwater installation-type water-flow power generation system 1 of this embodiment in our country includes the following items:

(a) Rise of Self-Sufficiency Rate of Energy

By distributedly arranging the underwater installation-type water-flow power generation systems 1 every 100 m in a flow direction 1000 km×width 25 km of the Black Current flowing, up to 2 million units of submerged caissons can be installed theoretically, and its theoretical total power generation amount is approximately 960 million kWh which largely exceeds the total power generation amount of Japan.

By using this ocean current energy which can be obtained without a rest, import of the fossil fuels can be reduced, which is considered to greatly contribute to rise of the energy self-sufficiency rate of our country. Moreover, due to the reduced import of the fuels, improvement of large trade deficits having continued since the fiscal year of 2011 is expected.

(b) Reduction of $CO_2$ Emission

After the East Japan Great Earthquake, the ratio of thermal power generation in our country has rapidly risen, which rapidly increases a domestic $CO_2$ emission, and a goal of 25% reduction over the year of 1990 before the Earthquake was changed to 3.8% reduction over 2005 after the Earthquake, and criticism in the international society is growing.

If the power generation amount of the ocean current power generation which is the regenerable energy increases by installation of the underwater installation-type water-flow power generation system 1 of this embodiment, a ratio of thermal power generation can be reduced, and contribution can be made to drastic reduction of $CO_2$ emission.

(c) Contribution to Local Industrial Development

In our country, the flow area through which the Black Current flows passes the shores of local prefectures of Okinawa, Kagoshima, Miyazaki, Kochi, Tokushima, and Wakayama.

Many of these prefectures depend on the tourism as their main industries, and sustainable development in the future can be considered to be difficult.

If a large-scale power generation facilities like the underwater installation-type water-flow power generation system 1 of this embodiment are installed in these prefectures without sufficient industrial resources, employment is promoted, contribution can be made to development of the area, and regional revitalization presented by the government can be supported.

INDUSTRIAL APPLICABILITY

The underwater installation-type water-flow power generation system according to the present invention can be applied in a wide range such that, in addition to the aforementioned installation in the sea area, a large power generation amount is obtained by installation in water areas such as large rivers with a stable water flow at all times or the relatively small-scale underwater installation-type water-flow power generation system illustrated in FIG. 6 is installed in medium to small rivers so as to supply electricity to customers in a small range and the like.

What is claimed is:
1. An underwater installation-type water-flow power generation system comprising:
a weight body fixedly installed on a bottom of a water area with a water flow;
a power generating device including a power generating device body arranged in a water flow area above the weight body in the water area and moored by the weight body through a mooring fixture, a diagonal plate frontage portion for water-flow inflow provided on a front part of the power generating device body, a variable blade type rotary impeller provided on a rear part of the power generating device body, and a power generator for obtaining a power generation output by using a rotary force of the variable blade type rotary impeller;
a hollow tank incorporated in the variable blade type rotary impeller and generating buoyancy equal to a weight of the rear part of the power generating device body; and a buoyancy body floating in the water-flow area above the power generating device body and applying a tension to the power generating device body through a pulling tool so that the diagonal plate frontage portion of the power generating device body is facing a direction of the water flow at all times so that a force of buoyancy is applied only to a range from a front end portion of the diagonal plate frontage portion of the power generating device body to an intermediate part of the power generating device body;

wherein by a combined action of the buoyancy balance on the rear part of the power generating device body by the hollow tank and the application of the tension to the front part of the power generating device body by the buoyancy body through the pulling tool, position control is executed so that the diagonal plate frontage portion is facing the direction of the water flow at all times.

2. An underwater installation-type water-flow power generation system comprising:

a weight body fixedly installed on a bottom of a water area with a water flow;

a power generating device including a power generating device body arranged in a water flow area above the weight body in the water area and moored by the weight body through a mooring fixture, a diagonal plate frontage portion for water-flow inflow provided on a front part of the power generating device body, a rotary-drum type variable blade type rotary impeller rotated by a water flow and provided on a rear flow side of the diagonal plate frontage portion, and a power generator mounted on a rear part side of the power generating device body and obtaining a power generation output by using a rotary force of the variable blade type rotary impeller; and a buoyancy body floating in the water-flow area above the power generating device body and applying a tension to the power generating device body through a pulling tool connected to the power generating device body;

wherein a hollow tank generating a buoyancy equal to a weight of a rear part of the entire power generating device in the water is incorporated in the variable blade type rotary impeller;

wherein the buoyancy body and the power generating device body are connected by the pulling tool so that an action of the tension by the buoyancy body is applied only to a range from a front end portion of the diagonal plate frontage portion forming the front part of the power generating device body to an intermediate part of the power generating device body; and wherein by a combined action of the buoyancy balance on the rear part of the power generating device body by the hollow tank and the application of the tension to the front part of the power generating device body by the buoyancy body through the pulling tool, position control is executed so that the diagonal plate frontage portion is facing the direction of the water flow at all times.

3. The underwater installation-type water-flow power generation system according to claim 1, wherein a plurality of the power generating devices are arranged in series in a direction orthogonal to a water flow direction.

4. The underwater installation-type water-flow power generation system according to claim 1, wherein a plurality of underwater installation-type water-flow power generation systems, each including the weight body, the power generating device, the buoyancy body, the mooring fixture, and the pulling tool, are arranged at plural sites in the water area with the water flow.

5. The underwater installation-type water-flow power generation system according to claim 2, wherein a plurality of the power generating devices are arranged in series in a direction orthogonal to a water flow direction.

6. The underwater installation-type water-flow power generation system according to claim 2, wherein a plurality of underwater installation-type water-flow power generation systems, each including the weight body, the power generating device, the buoyancy body, the mooring fixture, and the pulling tool, are arranged at plural sites in the water area with the water flow.

7. The underwater installation-type water-flow power generation system according to claim 3, wherein a plurality of underwater installation-type water-flow power generation systems, each including the weight body, the power generating device, the buoyancy body, the mooring fixture, and the pulling tool, are arranged at plural sites in the water area with the water flow of the sea or river.

* * * * *